US008413755B2

(12) United States Patent
Ito et al.

(10) Patent No.: US 8,413,755 B2
(45) Date of Patent: Apr. 9, 2013

(54) MOTORCYCLE

(75) Inventors: Shinji Ito, Saitama (JP); Toshiyuki Iwai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 765 days.

(21) Appl. No.: 11/898,903

(22) Filed: Sep. 17, 2007

(65) Prior Publication Data
US 2008/0066986 A1 Mar. 20, 2008

(30) Foreign Application Priority Data

Sep. 20, 2006 (JP) ................................. 2006-254880

(51) Int. Cl.
*B62K 11/02* (2006.01)
*B62D 61/02* (2006.01)
(52) U.S. Cl.
USPC ............ 180/226; 180/219; 180/230; 180/291
(58) Field of Classification Search .................. 180/219, 180/227, 228, 226, 230, 291, 292
See application file for complete search history.

(56) References Cited

U.S. PATENT DOCUMENTS

| 4,434,868 A * | 3/1984 | Brenner et al. ............... 180/226 |
| 6,427,796 B1 * | 8/2002 | Tsutsumikoshi ............. 180/227 |
| 2004/0140141 A1 * | 7/2004 | Soatti ............................. 180/226 |
| 2004/0254023 A1 * | 12/2004 | Manaka et al. ................ 464/179 |
| 2007/0045024 A1 * | 3/2007 | Koistra et al. ................. 180/227 |
| 2007/0193806 A1 * | 8/2007 | Ito et al. ........................ 180/227 |

FOREIGN PATENT DOCUMENTS

| JP | 2000-238544 A | 9/2000 |
| JP | 2006-96274 A | 4/2006 |

* cited by examiner

*Primary Examiner* — Tony H. Winner
*Assistant Examiner* — Jacob Knutson
(74) *Attorney, Agent, or Firm* — Birch Stewart Kolasch & Birch, LLP

(57) ABSTRACT

A motorcycle includes a rear fork with a first and the second extending portions, and a cross portion, the cross section linking the first and the second extending portions together. The first extending portion extends toward a first side of a rear wheel, the second extending portion extends toward a second side of the rear wheel. The first extending portion, which has an open cross sectional structure and through which a drive shaft is passed, is made to have larger outer diameter than the second extending portion, which has a closed cross sectional structure. Nonetheless, the rigidity of the first extending portion and the second extending portion are approximately the same. The drive shaft extends rearwardly and passes through the opening on the inside of the first extending portion.

16 Claims, 5 Drawing Sheets

MOTORCYCLE

CROSS-REFERENCE TO RELATED APPLICATION

The present application claims priority under 35 U.S.C. §119 to Japanese Patent Application No. 2006-254880, filed Sep. 20, 2006, the entire contents of which are hereby incorporated by reference.

BACKGROUND OF THE INVENTION

1. Field of the Invention

The present invention relates to an improved rear fork of a motorcycle equipped with a drive shaft.

2. Description of Background Art

There is a known type rear fork of a motorcycle in which a rear wheel and a gear case are provided in a rear end portion of the rear fork, and in which a drive shaft is provided between an output shaft of a power unit and a gear case. See, for example, Japanese Patent Application Laid-open Publication No. 2006-96274 (FIG. 2).

A motorcycle V shown in FIG. 2 of the above-mentioned document (the reference numerals used in this and the next paragraphs are of the cited document) is a vehicle equipped with a shaft-drive system, which vehicle includes: a vehicle body frame F; a first and a second support blocks 10 and 15, which are respectively attached to a left and a right side portions Fa and Fb of the vehicle body frame F so as to be movable rotationally; a front-end cross member 3, which is attached between the first and the second support blocks 10 and 15; rear-fork pipes 1 and 2, which extend rearward respectively from the first and the second support blocks 10 and 15; and a propeller shaft 7, which is disposed inside the rear-fork pipe 1.

Incidentally, each of the rear-fork pipes 1 and 2 (hereinafter referred to as extending members 1 and 2 respectively) has a closed cross-section structure. The propeller shaft 7 (hereinafter referred to as drive shaft 7) disposed inside the extending member 1 makes the extending members 1 and 2 respectively have cross sections that differ in size from each other. The difference in size of cross section between the extending members 1 and 2 renders the rigidity of the extending member 1 significantly different from that of the extending member 2. This leaves a room for improvement in light of the maneuverability and the like.

An object of the present invention is to provide a motorcycle equipped with a rear fork which has a first and a second extending portions, and a drive shaft passed through the inside of the first extending portion, and in which the rigidities respectively of the first and the second extending portions are approximately the same.

SUMMARY AND OBJECTS OF THE INVENTION

A first aspect of the present invention provides a motorcycle with the following characteristics. A rear fork is attached to a body frame so as to swing up and down freely. A rear wheel is attached to the rear end portion of the rear fork. A gear case is attached to a side of the rear wheel. A drive shaft is provided between the gear case and an output shaft of a power unit. The output of the power unit is transmitted to the rear wheel via the drive shaft and the gear case. The rear fork includes a first extending portion, which extends to a first side of the rear wheel, and a second extending portion, which extends to a second side of the rear wheel. The drive shaft is passed through the inside of the first extending portion. The first extending portion, which has an open cross-section structure, is made wider than the second extending portion, which has a closed cross-section structure.

A second aspect of the present invention is characterized in that the gear case is supported by a rear-wheel axle provided in the rear end portion of the rear fork, and that a torque rod, which links an outer periphery portion of the gear case with a front end portion of the rear fork, serves as a stopper for rotation of the gear case.

A third aspect of the present invention is characterized in that the first and the second extending portions are joined together by a cross portion in front of the rear wheel while the first extending portion and the cross portion are integrally formed by casting.

Effects of the Invention include the following:

In the first aspect of the present invention, the outside diameter of the first extending portion is made larger than that of the second extending portion. Accordingly, when both extending portions commonly had closed cross sectional structures, the first extending portion would be more rigid than the second extending portion. Alternatively, when the outside diameters of the two extending portions were the same, the first extending portion with an open cross sectional structure would be less rigid than the second extending portion with a closed cross sectional structure.

Therefore, the first extending portion is formed to have a larger outside diameter and an open cross sectional structure while the second extending portion is formed to have a smaller outside diameter and a closed cross sectional structure.

Now that different outside diameters are combined with different cross sectional structures as described above, the two extending portions have approximately the same rigidities.

In the second aspect of the invention, the gear case is supported by the rear-wheel axle provided in the rear end portion of the rear fork, and the torque rod, which links the outer peripheral portion of the gear case with the front end portion of rear fork, serves as a stopper for rotation of the gear case. Accordingly, the front end portion of the rear fork receives the force that would otherwise rotate the gear case when the power is transmitted. The force that would otherwise rotate the gear case is received by the front end portion of the rear fork, so that the first extending portion does not have to be very strong. The first extending portion, which does not have to be very strong, can be made in a smaller wall thickness, and thus the increase in weight of the rear fork can be suppressed.

In the third aspect of the invention, the cross portion and the first extending portion with an open cross sectional structure are integrally formed by casting. The open cross sectional structure of the first extending portion helps simplify the structure of the mold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
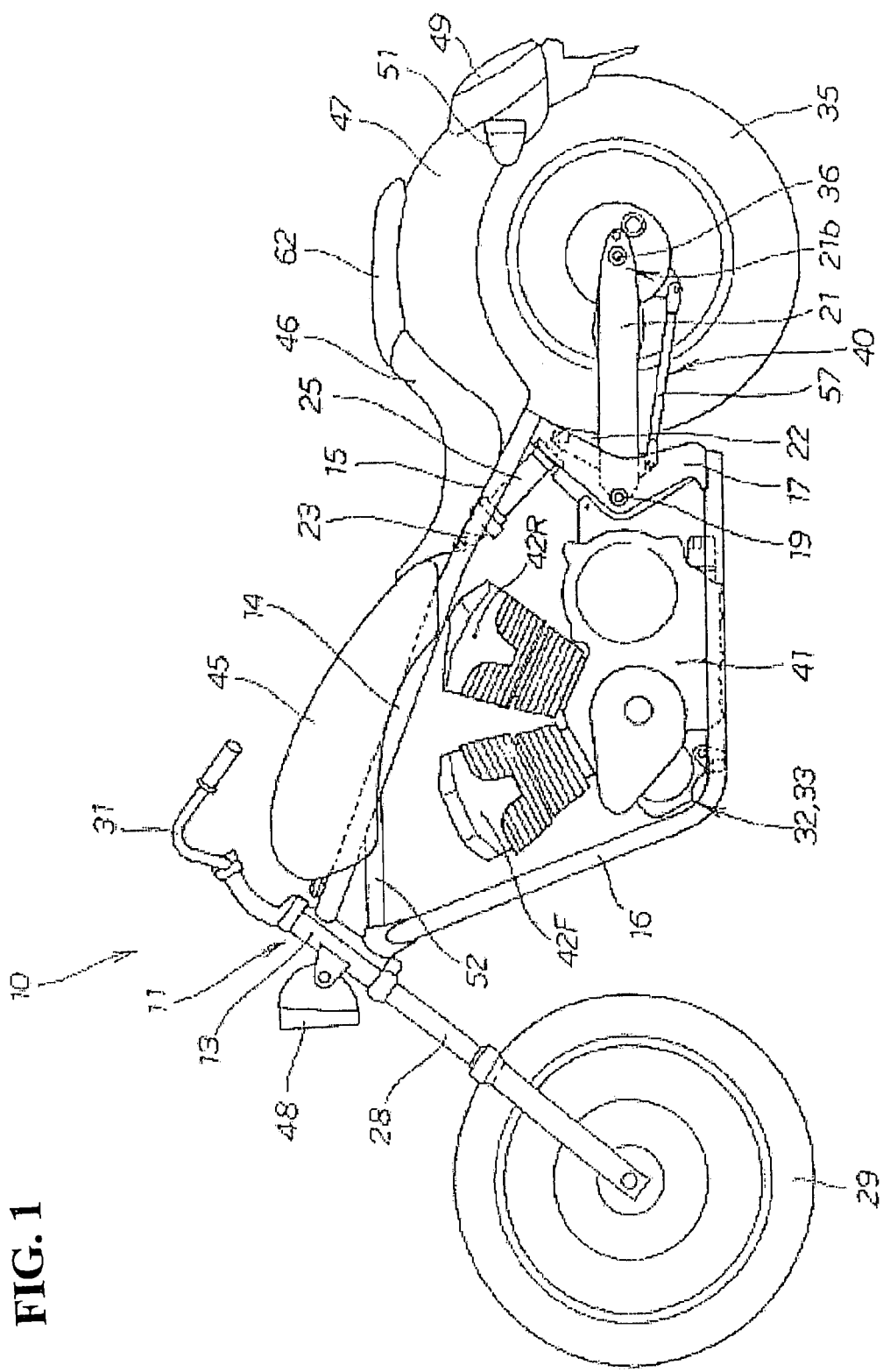
FIG. 1 is a left-side view of a motorcycle according to an embodiment of the invention.

FIG. 1 is a left side view of a motorcycle according to the present invention.

A motorcycle 10 is a vehicle provided with a body frame 11. The body frame 11 is configured as follows. A head pipe 13 is provided in the front end portion of the vehicle, and a main frame 14 extends rearward from the head pipe 13. Seat rails 15, 15 (only the seat rail 15 of the near side is shown in the drawing) extend rearward from the rear end portion of the main frame 14, and down frame 16, 16 (only the down frame 16 of the near side is shown in the drawing) extend obliquely downward from the head pipe 13. Rear frames 17, 17 (only the rear frame 17 of the near side is shown in the drawing) are also provided. Each rear frame 17 links the rear end of each of the down frames 16, 16 with the rear end of the corresponding one of the seat rails 15, 15. A pivot shaft 19 is attached to the rear frames 17, 17 so as to pivot freely, and a rear fork 21 is attached to the pivot shaft 19 so as to swing up and down freely about the pivot shaft 19. Furthermore, a rear cushion unit 25 links a front portion 22 of the rear fork 21 and a rear portion 23 of the main frame 14.

In the motorcycle 10, a steerable front fork 28 is attached to the head pipe 13. While a rotatable front wheel 29 is attached to the lower end of the front fork 28, a steering handle bar 31 is attached to the upper portion of the front fork 28. An engine 33 as a power unit 32 is placed in a space surrounded by the main frame 14 and the down frame 16. A rear wheel 35 is attached to a rear end portion 21b of the rear fork 21 and is allowed to freely move rotatingly. A shaft-drive system 40 is placed between a rear-wheel axle 36, which supports a rear wheel 35, and the engine 33 to transmit the driving power of the engine 33 to the rear wheel 35.

The engine 33 is a V-type two-cylinder engine, and includes a crankcase 41 and two cylinder portions 42F and 42R, which stand up from the crankcase 41. A fuel supply system, an exhaust pipe, a muffler and the like are omitted from the drawing.

Members also shown in FIG. 1 are a fuel tank 45, a driver's seat 46, a rear fender 47, a headlight 48, a tail light 49, rear turn signals 51, 51 (only the rear turn signal 51 of the near side is shown in the drawing), and a gusset member 52 for reinforcing the body frame 11.

Figure 2:
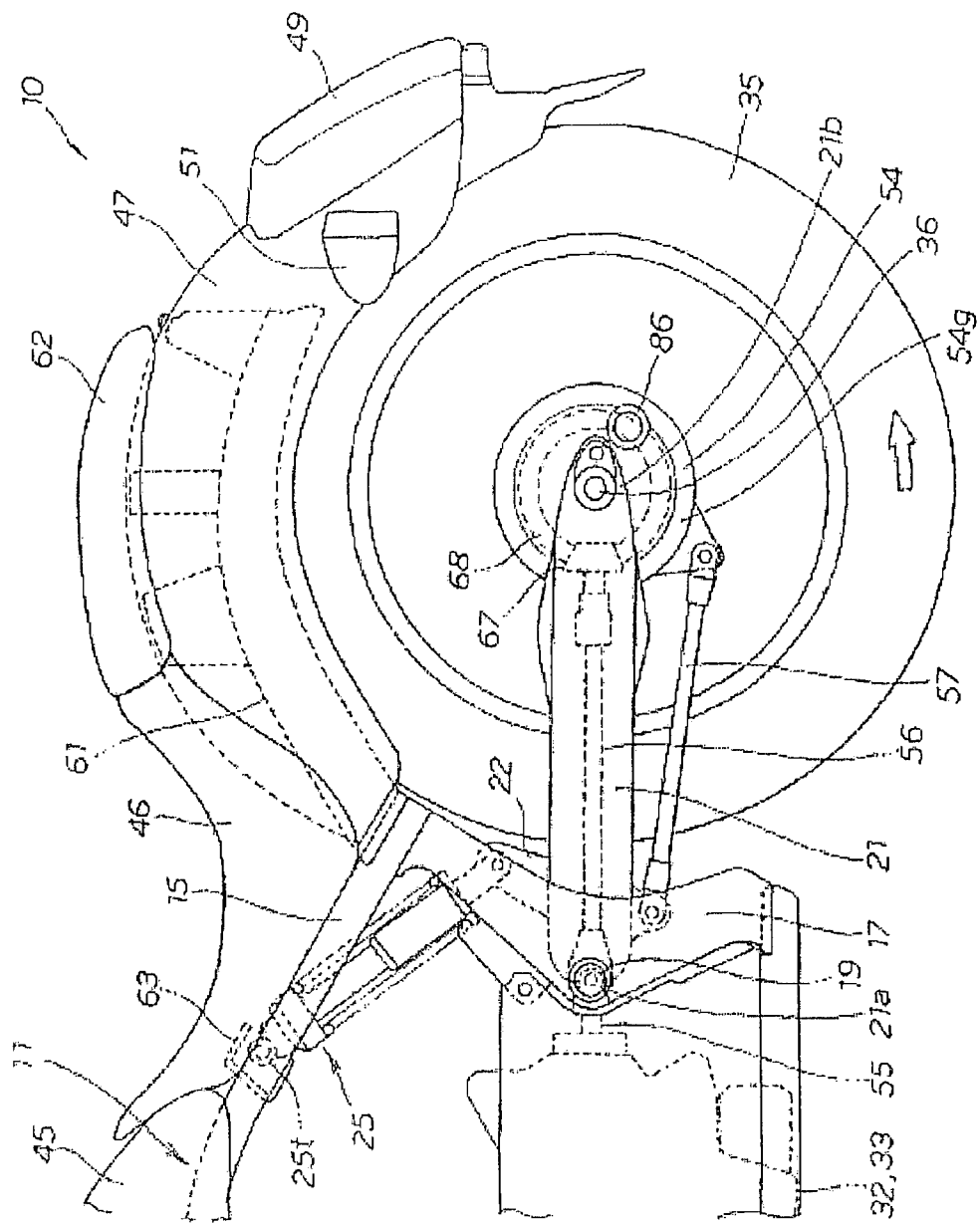
FIG. 2 is a left-side view of a rear portion of the motorcycle according to the embodiment of the invention.

FIG. 2 is a left side view of the rear portion of the motorcycle according to the invention.

In the motorcycle 10, the rear fork 21 is attached to, while extending rearward from, the rear frame 17, which forms a part of the body frame 11, with the pivot shaft 19 placed in between, and thus, the rear fork 21 swings up and down freely. The rear wheel 35 is attached to the rear end portion 21b of the rear fork 21, and at a side of the rear wheel 35, a gear case 54 is provided. A drive shaft 56 is provided between the gear case 54 and an output shaft 55 of the engine 33 as the power unit 32. The output of the engine 33 is transmitted to the rear wheel 35 via the drive shaft 56 and the gear case 54.

The gear case 54 is supported by the rear-wheel axle 36 provided in the rear end portion 21b of the rear fork 21. A torque rod 57, which links an outer peripheral portion 54g of the gear case 54 with the rear fork 21, stops the rotation of the gear case 54.

A rear-portion frame 61 extends rearward from the seat rails 15, 15 (only the seat rail 15 of the near side is shown in the drawing), and the rear fender 47 and a pillion seat 62 are attached to the rear-portion frame 61.

Shown in the drawing, is a bracket 63 provided to the rear portion of the main frame 14 to hold an upper end portion 25t of the rear cushion unit 25.

Figure 3:
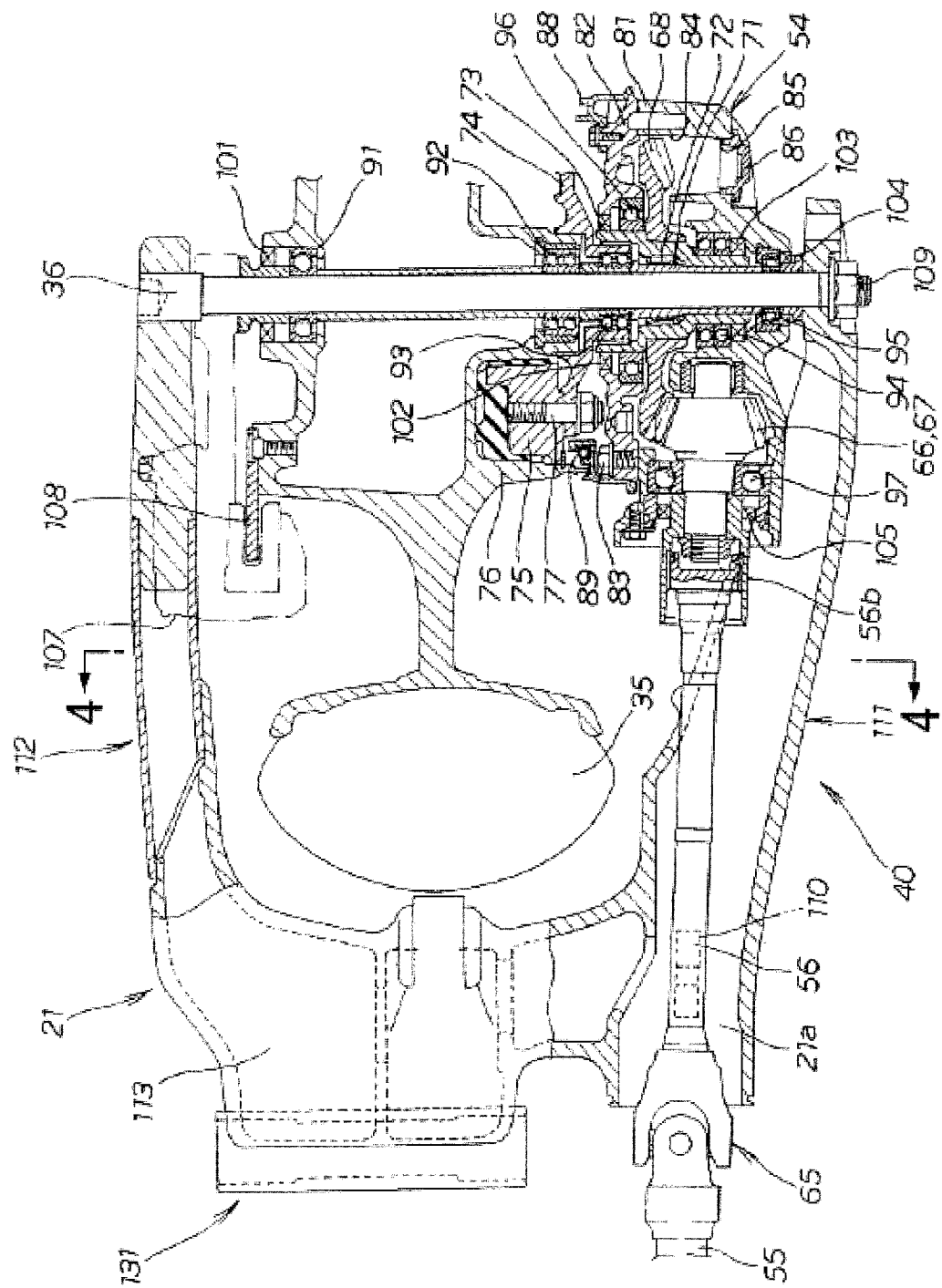
FIG. 3 is a cross sectional view for describing a shaft-drive system and a portion around the system of the motorcycle according to the embodiment of the invention.

FIG. 3 is a cross sectional view for describing the shaft-drive system and the portion around the shaft-drive system of the motorcycle according to the invention. What follows are, firstly, a description on the structure of the shaft-drive system 40, and then a description on the rear fork 21, which supports the shaft-drive system 40 and the rear wheel 35.

The shaft-drive system 40 transmits, while changing the direction of, the driving power of the drive shaft 56 to the rear wheel 35. Principal components of the shaft-drive system 40 includes the drive shaft 56 attached to the output shaft 55 of the engine (denoted by the reference numeral 33 in FIG. 1) with a universal joint 65. Also included are a drive gear 67 and a final driven gear 68. The drive gear 67, as a gear 66 of the drive-shaft side, is attached to a rear end portion 56b of the drive shaft 56. The final driven gear 68 meshes with the drive gear 67, and thus the direction of the driving power is changed. The gear case 54, which accommodates the gears 67 and 68, is also a principal component of the system 40.

The final driven gear 68 is press-fitted onto a sleeve 73, which is supported by bearings 94, 96. A damper retainer 74 is attached to, and rotates together with, the sleeve 73 while a damper member 75 is attached to the damper retainer 74 with a bolt 77.

A bearing 72 is disposed on the outer circumference of the rear-wheel axle 36 with a spacer 71 interposed in between. The bearing 72 and another bearing 95 support the final gear unit including the gear case 54.

A buffering system is provided between the final driven gear 68 and the rear wheel 35. In this embodiment, the damper member 75 serves as the buffering system. The damper member 75, which is interposed between the final driven gear 68 and a hub 76 of the rear wheel 35, mitigates the shock that derives from the fluctuation of the torque while the torque is transmitted from the drive shaft 56 to the rear wheel 35.

The gear case 54 includes a main body portion 81 and a lid portion 82, which covers the main body portion 81 from the inner side of the vehicle towards the outer side thereof. The lid portion 82 is put on the main body 81, and then they are fixed together with a fastening member 83. Thus, a gear chamber 84 is formed inside the gear case 54, and the drive gear 67 and the final driven gear 68, which meshes with the drive gear 67, are placed in the gear chamber 84. An oil inlet port 85 is formed in the gear chamber 84, and allows oil to enter the gear chamber 84. A cap 86 usually closes the oil inlet port 85.

A ring member 88 as a dust-guard plate is attached to the lid portion 82 from the inner side of the vehicle while a breather tube 89, which allows the gear chamber 84 to communicate to the atmosphere, is attached to the ring member 88.

Some of the other members shown in FIG. 3 include bearings 91 to 94, 96 and 97, seal members 101 to 105, a disc-brake unit 107, a disc-brake plate 108, and a nut 109 for fixing the rear-wheel axle 36 to the rear fork 21.

The rear fork 21 includes a first extending portion 111, a second extending portion 112, and a cross portion 113, which links the first and the second extending portions 111 and 112.

The first extending portions 111 and 112 extend respectively toward a first and a second sides of the rear wheel 35. The cross portion 113 links the first and the second extending portions 111 and 112 in front of the rear wheel 35. A support pipe 131, through which the pivot shaft (the pivot shaft 19 in FIG. 1) is passed, is attached to the cross portion 113.

Note that the cross portion 113 constitutes a front end portion 21a of the rear fork 21.

Figure 4:
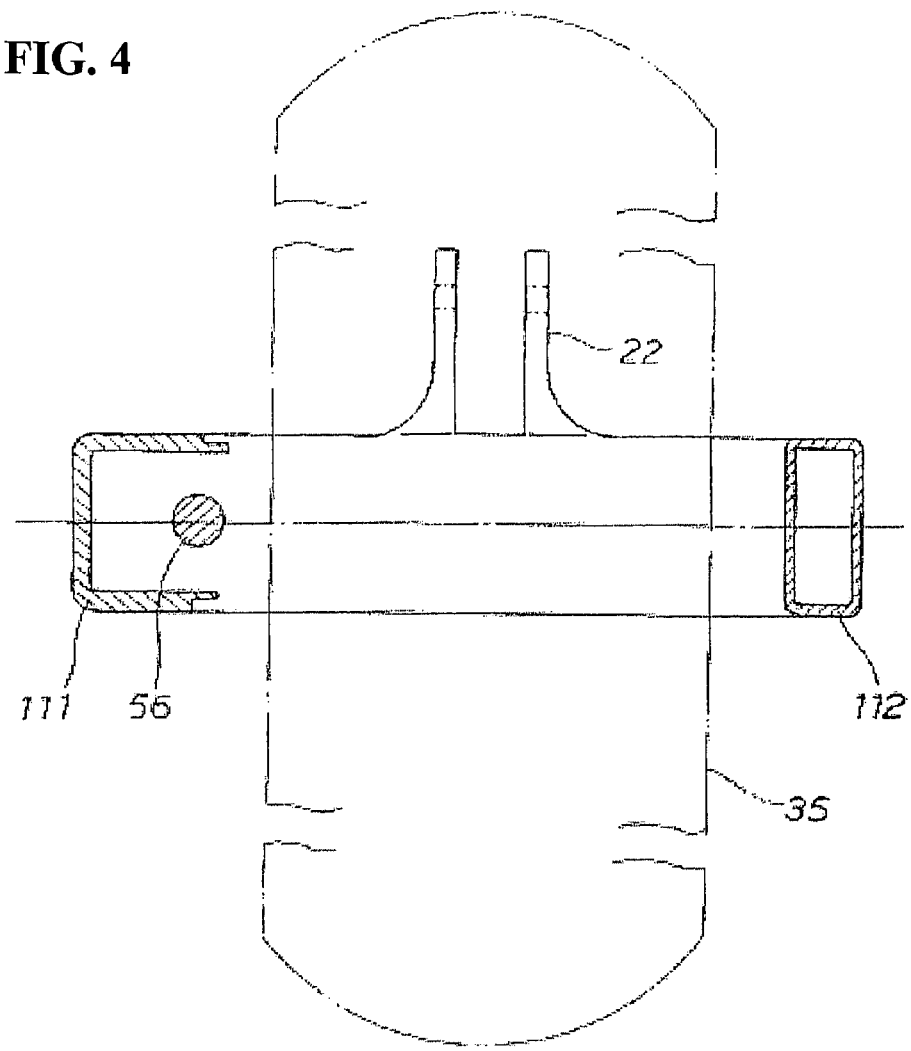
FIG. 4 is a cross sectional view taken along the line 4-4 of FIG. 3.

FIG. 4 is a cross sectional view taken along the line 4-4 of FIG. 3. The drive shaft 56 is passed through the first extending portion 111. The first extending portion 111, which has an open cross sectional structure, is made wider than the second extending portion 112, which has a closed cross sectional structure.

Next, descriptions will be given as to some of the advantageous effects of the above-described rear fork.

The outside diameter of the first extending portion 111 is made larger than that of the second extending portion 112. Accordingly, when both extending portions 111 and 112 commonly had closed cross sectional structures, the first extending portion 111 would be more rigid than the second extending portion 112.

Alternatively, when the outside diameters of the two extending portions 111 and 112 were the same, the first extending portion 111 with an open cross sectional structure would be less rigid than the second extending portion 112 with a closed cross sectional structure.

Therefore, the first extending portion 111 is formed to have a larger outside diameter and an open cross sectional structure with an open portion 114 while the second extending portion 112 is formed to have a smaller outside diameter and a closed cross sectional structure.

Now that different outside diameters are combined with different cross sectional structures as described above, the two extending portions have approximately the same rigidities.

Now, refer back to FIG. 2. The gear case 54 is supported by the rear-wheel axle 36 provided in the rear end portion 21b of the rear fork 21. The torque rod 57, which links the outer peripheral portion 54g of the gear case 54 with the front end portion 21a of the rear fork 21, stops the rotation of the gear case 54. Accordingly, the front end portion 21a of the rear fork 21 receives the force that would otherwise rotate the gear case 54 when the power is transmitted. The force that would otherwise rotate the gear case 54 is received by a torque-rod support portion 110 in the front end portion 21a of the rear fork 21, so that the first extending portion 111 does not have to be very rigid. Rather, the strength of the first extending portion 111 can be lowered. The first extending portion 111, which now needs only a lowered strength, can be made in a smaller wall thickness, and thus the increase in weight of the rear fork 21 can be suppressed.

Figure 5A:
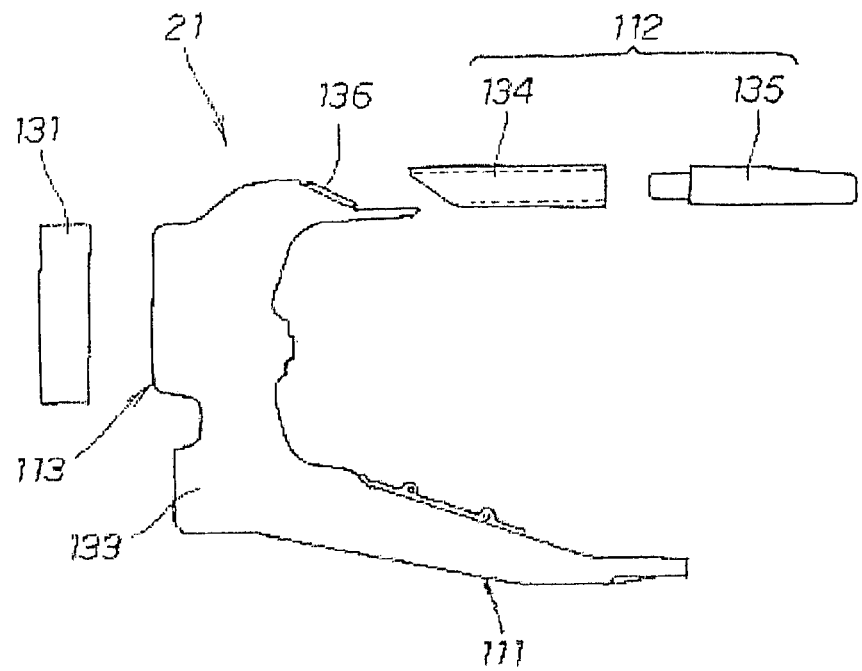
FIGS. 5A and 5B are views for describing the structure of a rear fork according to the embodiment of the invention, respectively in a separated state and in an assembled state.
Figure 5B:
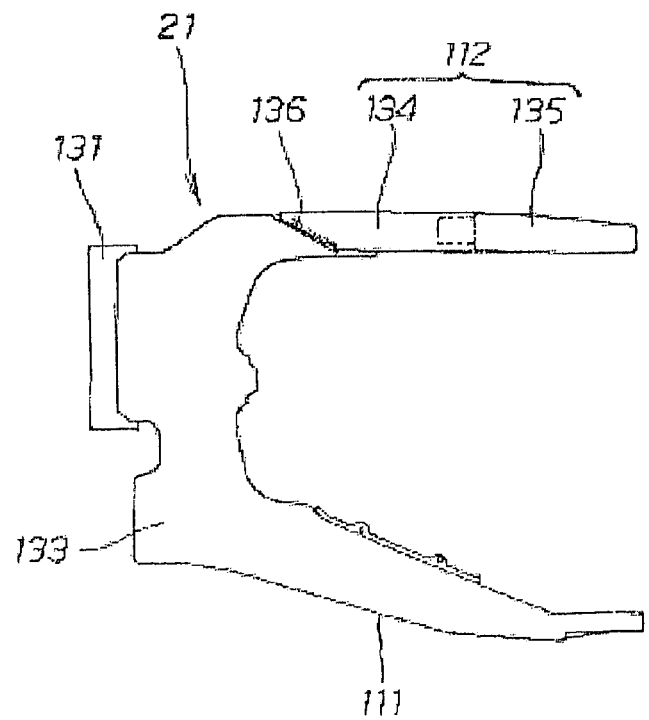

FIGS. 5A and 5B are views for describing the structure of the rear fork according to the embodiment of the invention, respectively in a separated state and in an assembled state.

FIG. 5A shows, in order from the front to the rear, the support pipe 131, a cross extending member 133, an angle pipe 134, and a solid member 135, all of which constitute the rear fork 21.

The cross extending member 133 corresponds approximately to the first extending portion 111 and the cross portion 113 while the angle pipe 134 and the solid member 135 correspond to the second extending portion 112.

FIG. 5B shows that the support pipe 131 is attached to the cross extending member 133, and that the angle pipe 134 is attached to a joint portion 136, which is formed on the opposite side of the cross extending member 133 from the place where the support pipe 131 is attached. To the rear end portion of the angle pipe 134, the solid member 135 is attached. The rear fork 21 is formed in this way.

The cross portion 113 and the first extending portion 111 with an open cross sectional structure are integrally formed by casting. The open cross sectional structure of the first extending portion 111 helps simplify the structure of the mold.

It should be noted that, as to the first aspect of the invention, the torque rod 57 for stopping the rotation of the gear case 54 may be joined not to the front end portion 21a of the rear fork 21, but to the first extending portion 111. Alternatively, while the torque rod 57 is eliminated, a stopper pin may be provided to the rear fork 21, instead. Otherwise, the torque rod 57 may be joined to the rear frame 17.

Moreover, the torque rod 57 may be provided not below the rear fork 21, but above the rear fork 21.

The present invention is preferably applied to a rear fork for motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a rear fork attached to a body frame so as to swing up and down freely;
   a rear wheel attached to a rear end portion of the rear fork;
   a gear case attached to a first side of the rear wheel;
   a drive shaft, which is provided between the gear case and an output shaft of a power unit, and which, together with the gear case, transmits the output of the power unit to the rear wheel;
   a first extending portion of the rear fork which extends to the first side of the rear wheel;
   a second extending portion of the rear fork which extends to a second side of the rear wheel, and
   a torque rod extending adjacent to and exterior of the first extending portion, said torque rod being operatively connected to an outer periphery portion of the gear case for linking the outer periphery portion of the gear case to a front end portion of the rear fork for preventing rotation of the gear case;
   wherein the drive shaft passes through the first extending portion, and
   the first extending portion, which has an open cross-section structure, is made wider than the second extending portion, which has a closed cross-section structure, and further comprising:
   a rear axle extending between rear portions of the first and second extending portions of the rear fork,
   wherein the gear case and the first extending portion are mounted on the rear axle independently of each other in positions such that one lateral side of the gear case directly faces the first side of the rear wheel, and an opposite lateral side of the gear case directly faces the rear portion of the first extending portion, wherein the second extending portion includes an angle pipe attached to a joint portion formed on a cross portion of the rear fork, and a solid member attached to a rear end portion of the angle pipe.

2. The motorcycle according to claim 1, further comprising:
a cross portion of the rear fork,
wherein the first and the second extending portions are joined together by the cross portion in front of the rear wheel, and
the first extending portion and the cross portion are integrally formed by casting.

3. The motorcycle according to claim 1, wherein the torque rod extends rearwardly from a portion of the front end portion of the rear fork that is lower and rearward than a position of a pivot shaft, and
a shock absorber extends upwardly and forwardly from an upper portion of the front end portion of the rear fork.

4. The motorcycle according to claim 1, wherein the first extending portion is formed with an outside diameter that is larger than an outside diameter of the second extending portion.

5. The motorcycle according to claim 1, wherein the rear fork includes a single support pipe which pivots about a pivot shaft, the support shaft and the pivot shaft having midpoints that are off-set laterally with respect to a longitudinal centerline of the rear wheel of the motorcycle in a direction toward the second side of the rear wheel.

6. A motorcycle comprising:
a rear fork attached to a body frame so as to swing up and down freely;
a rear wheel attached to a rear end portion of the rear fork;
a gear case attached to a first side of the rear wheel;
a drive shaft, which is provided between the gear case and an output shaft of a power unit, and which, together with the gear case, transmits the output of the power unit to the rear wheel;
a first extending portion of the rear fork which extends to the first side of the rear wheel;
a second extending portion of the rear fork which extends to a second side of the rear wheel, and
a torque rod extending adjacent to and exterior of the first extending portion, said torque rod being operatively connected to an outer periphery portion of the gear case for linking the outer periphery portion of the gear case to a front end portion of the rear fork for preventing rotation of the gear case;
wherein the drive shaft passes through the first extending portion, and
the first extending portion, which has an open cross-section structure, is made wider than the second extending portion, which has a closed cross-section structure,
wherein the torque rod has one end directly attached to a lower portion of the front end portion of the rear fork and an opposite end directly attached to a lower portion of the gear case, and
wherein the gear case and the first extending portion are mounted on a rear axle independently of each other in a manner such that an outer side of the gear case is exposed and faces an inner side of the first extending portion.

7. The motorcycle according to claim 6, wherein the second extending portion includes an angle pipe attached to a joint portion formed on the cross portion of the rear fork, and a solid member attached to a rear end portion of the angle pipe.

8. The motorcycle according to claim 6, further comprising:
a rear-wheel axle provided in the rear end portion of the rear fork; and
wherein the gear case is supported by the rear axle.

9. A motorcycle comprising:
a rear fork having a single support pipe attached to a body frame enabling the rear fork swing up and down freely about a pivot shaft;
a rear wheel attached to a rear end portion of the rear fork;
a gear case attached to a first side of the rear wheel;
a drive shaft, which is provided between the gear case and an output shaft of a power unit, and which, together with the gear case, transmits the output of the power unit to the rear wheel;
a first extending portion of the rear fork, which portion extends to the first side of the rear wheel;
a second extending portion of the rear fork, which extends to a second side of the rear wheel, and
a torque rod extending adjacent to and exterior of the first extending portion, said torque rod being operatively connected to an outer periphery portion of the gear case for linking the outer periphery portion of the gear case to a front end portion of the rear fork for preventing rotation of the gear case;
wherein the drive shaft is passed through the first extending portion, and
the first extending portion, which has an open cross-section structure, is made wider than the second extending portion, which has a closed cross-section structure,
wherein the first extending portion includes an opening on an inner side facing the first side of the rear wheel, the drive shaft extending rearwardly through the opening and connecting with the gear case,
wherein the single support pipe and the pivot shaft have midpoints that are off-set laterally with respect to a longitudinal centerline of the rear wheel of the motorcycle in a direction toward the second side of the rear wheel,
wherein the torque rod includes one end directly attached to a lower portion of the front end portion of the rear fork in a position to a rear of the support pipe and an opposite end directly attached to a lower portion of the gear case in a position forward of the rear axle.

10. The motorcycle according to claim 9, further comprising:
a rear-wheel axle provided in the rear end portion of the rear fork; and
wherein the gear case is supported by the rear axle.

11. The motorcycle according to claim 10, further comprising:
a cross portion of the rear fork,
wherein the first and the second extending portions are joined together by the cross portion in front of the rear wheel, and
the first extending portion and the cross portion are integrally formed by casting.

12. The motorcycle according to claim 9, further comprising:
a cross portion of the rear fork,
wherein the first and the second extending portions are joined together by the cross portion in front of the rear wheel, and
the first extending portion and the cross portion are integrally formed by casting.

13. The motorcycle according to claim 12, wherein the second extending portion includes an angle pipe attached to a joint portion formed on the cross portion of the rear fork, and a solid member attached to a rear end portion of the angle pipe.

14. The motorcycle according to claim 9, wherein the torque rod extends rearwardly from a portion of the front end portion of the rear fork that is lower and rearward than a position of the pivot shaft, and a shock absorber extends upwardly and forwardly from an upper portion of the front end portion of the rear fork.

15. The motorcycle according to claim 9, wherein the first extending portion is formed with an outside diameter that is larger than an outside diameter of the second extending portion.

16. The motorcycle according to claim 9, wherein the second extending portion includes an angle pipe attached to a joint portion formed on a cross portion of the rear fork, and a solid member attached to a rear end portion of the angle pipe.

* * * * *